US006999187B2

(12) United States Patent
Tanaka

(10) Patent No.: US 6,999,187 B2
(45) Date of Patent: Feb. 14, 2006

(54) IMAGE FORMING APPARATUS, COMMUNICATION SYSTEM FOR MAINTENANCE OF IMAGE FORMING APPARATUS, MAINTENANCE SERVICE METHOD OF IMAGE FORMING APPARATUS, AND MEDIUM STORING INFORMATION TO BE USED IN MAINTENANCE

(75) Inventor: Toshiaki Tanaka, Fukaya (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 905 days.

(21) Appl. No.: 09/895,877

(22) Filed: Jul. 2, 2001

(65) Prior Publication Data

US 2003/0002065 A1    Jan. 2, 2003

(51) Int. Cl.
*B41F 1/00*    (2006.01)
(52) U.S. Cl. .................. 358/1.14; 358/1.13; 358/1.15; 358/1.16; 358/1.18; 358/406; 358/442; 714/46; 382/238
(58) Field of Classification Search ............. 358/1.13, 358/1.18, 402, 442, 406, 468, 400, 434, 1.14, 358/1.15, 1.16; 382/238; 714/446
See application file for complete search history.

(56) References Cited

U.S. PATENT DOCUMENTS

| 5,619,307 | A    |   | 4/1997  | Machino et al. ............. 399/11    |
|-----------|------|---|---------|----------------------------------------|
| 5,914,789 | A    | * | 6/1999  | Murata ....................... 358/442  |
| 5,935,262 | A    | * | 8/1999  | Barrett et al. ................ 714/46  |
| 5,936,746 | A    | * | 8/1999  | Hirokawa .................... 358/468   |
| 6,043,899 | A    | * | 3/2000  | Morohashi et al. ........ 358/1.18      |
| 6,137,597 | A    | * | 10/2000 | Kanaya ...................... 358/402   |
| 6,222,645 | B1   | * | 4/2001  | Kagawa ...................... 358/434   |
| 6,459,504 | B1   | * | 10/2002 | Murano et al. ............. 358/406     |
| 6,577,768 | B1   | * | 6/2003  | Ushida ........................ 382/238 |
| 6,804,016 | B1   | * | 10/2004 | Hashimoto et al. ........ 358/1.13      |
| 6,825,954 | B1   | * | 11/2004 | Nakamura .................. 358/400     |

FOREIGN PATENT DOCUMENTS

| JP | 5-14576   | 1/1993 |
| JP | 8-23408   | 1/1996 |
| JP | 11-69063  | 3/1999 |
| JP | 11-202699 | 7/1999 |

\* cited by examiner

*Primary Examiner*—Kimberly Wiliams
*Assistant Examiner*—Satwant Singh
(74) *Attorney, Agent, or Firm*—Foley & Lardner LLP

(57) ABSTRACT

As information for use in the maintenance of an image forming apparatus, information indicating an error occurrence portion, machine status information, operation log information, and the like is output and periodically transferred to a maintenance service provider by, e.g., mail, FAX transmission, or transfer across the Internet, without any load on the user. This helps improve the maintenance service, e.g., predict failures and reserve maintenance parts.

22 Claims, 10 Drawing Sheets

FIG.19

| | DATE/TIME | ERROR CODE | MONOCHROMATIC COLOR | NUMBER OF COPIES | ORIGINAL SIZE | OUTPUT SIZE | ONE-SIDED/TWO-SIDED | ORIGINAL SUPPLY | NUMBER OF ORIGINALS | SUPPLY SELECTION | SORT | FINISHING | CODED DATA (DECIMAL NUMBER) | CODED DATA (BASE-32 NUMBER) |
|---|---|---|---|---|---|---|---|---|---|---|---|---|---|---|
| POWER ON=100 WARM UP=101 KEEP IMAGE QUALITY=102 POSITIONING=103 COPY=201 PRINT=202 ERROR=300 MAINTENANCE CALL=301 | | 00=JAM + LOCATION ETC. | 0/1 | NUMERICAL VALUE | A/B=0/1 + SIZE NUMBER | A/B=0/1 + SIZE NUMBER | 0/1 | MANUAL FEED=0 AUTOMATIC=1 PRINT=2 | NUMERICAL VALUE | MANUAL FEED=0 CASSETTE NUMBER FOR CASSETTE | NORMAL=0 SORT=1 GROUP=2 | NONE=0 STAPLE=1 | | |
| 100 | 0009210823 | | | | | | | | | | | | 1000009210823 | T3AJ36U7 |
| 101 | | | | | | | | | | | | | 101 | 35 |
| 102 | | | | | | | | | | | | | 102 | 36 |
| 103 | | | | | | | | | | | | | 103 | 37 |
| 201 | | | 0 | 1 | 03 | 03 | 0 | 0 | 1 | 1 | 0 | 0 | 2010103030301100 | 5MQ5DR9oGC |
| 202 | | | 1 | 3 | 04 | 04 | 1 | 1 | 5 | 2 | 1 | 1 | 20213040411521 | 5NQoJEV0oB |
| 201 | | | 0 | 5 | 04 | 04 | 0 | 2 | 0 | 1 | 1 | 0 | 2010504040201 10 | 5MRAoUJNSE |
| 300 | 0009211200 | 0012 | | | | | | | | | | | 30000092112000012 | QKKTJOP1500 |
| 201 | | | 0 | 1 | 03 | 03 | 0 | 0 | 1 | 1 | 0 | 0 | 2010103030301100 | 5MQ5DR9oGC |
| ... | | | | | | | | | | | | | | |
| ... | | | | | | | | | | | | | | |

FIG.20

| | CODE | VALUES AFTER SETTING AND ADJUSTMENT FOLLOWING DESCRIBED PRESCRIPTION | | | | | CODED DATA (DECIMAL NUMBER) | CODED DATA (BASE-32 NUMBER) |
|---|---|---|---|---|---|---|---|---|
| MOTOR SET VALUE | 500 | 50 | 50 | 60 | 55 | 50 | 5005060554952 | 4HLADMG68 |
| READING POSITION CORRECTION VALUE | 501 | 50 | 50 | 51 | 55 | 52 | 5015050515052 | 1EMJ88BC |
| FIXING TEMPERATURE SETTING | 502 | 50 | 50 | 60 | 70 | 81 | 5025060607081 | 1EP1MQF9 |
| γ CORRECTION VALUE | 503 | 50 | 50 | 52 | 53 | 49 | 5035050525349 | 1ES1O2T5 |
| COLOR SUPERPOSITION CORRECTION VALUE K | 504 | 50 | 50 | 50 | 50 | 50 | 5045050505050 | 1EVHB7AQ |
| COLOR SUPERPOSITION CORRECTION VALUE C | 505 | 50 | 51 | 51 | 52 | 49 | 5055151505249 | 1F2HLGB1 |
| COLOR SUPERPOSITION CORRECTION VALUE M | 506 | 50 | 53 | 52 | 48 | 50 | 5065352524850 | 1F5iUSRi |
| COLOR SUPERPOSITION CORRECTION VALUE Y | 507 | 48 | 50 | 50 | 51 | 50 | 5074850515150 | 1F8DHF1U |
| REGISTRATION TIMING VALUE | 508 | 50 | 50 | 53 | 52 | 51 | 5085053525251 | 1FBER5QJ |
| ... | | | | | | | | |
| ... | | | | | | | | |

IMAGE FORMING APPARATUS, COMMUNICATION SYSTEM FOR MAINTENANCE OF IMAGE FORMING APPARATUS, MAINTENANCE SERVICE METHOD OF IMAGE FORMING APPARATUS, AND MEDIUM STORING INFORMATION TO BE USED IN MAINTENANCE

BACKGROUND OF THE INVENTION

The present invention relates to an image forming apparatus such as a copying machine or printer, a communication system for the maintenance of an image forming apparatus, a maintenance service method of an image forming apparatus, and a medium storing information to be used in maintenance.

Network printers are in widespread use, and data is extensively transmitted and received across networks.

Meanwhile, image forming apparatuses such as copying machines and standalone type printers are not connected to networks in almost all cases.

Even when an image forming apparatus is connected to a local area network (to be referred to as a LAN hereinafter) and this LAN is connected to an external network, the image forming apparatus cannot be readily connected to an external system in many instances owing to fire walls or the like. That is, presently most image forming apparatuses cannot exchange data with external systems via communication lines or channels.

Japanese Patent No. 2917344 proposes an invention by which an image forming apparatus and an external system are connected via a communication line, and the external system determines, e.g., whether the apparatus can be used, by exchanging status information of the apparatus and control signals. However, this system is difficult to construct for the reason described above.

SUMMARY OF THE INVENTION

It is, therefore, an object of the present invention to provide an image forming apparatus, a communication system for the maintenance of an image forming apparatus, a maintenance service method of an image forming apparatus, and a medium storing information to be used in maintenance, by which error information, machine status information, operation log information, and the like are output, as information to be used in the maintenance of an image forming apparatus, and periodically transferred to a maintenance service provider without any load on the user, thereby improving the maintenance service, e.g., predicting failures and reserving maintenance parts.

According to the present invention, there is provided an image forming apparatus for printing out data on the basis of given information, comprising a memory for storing information for use in maintenance of the image forming apparatus, a capacity determination unit for, when a use capacity of the memory has reached a predetermined value, notifying the memory of information representing that the use capacity has reached the predetermined value and instructing the memory to output the stored information, and a compressing unit for compressing the output information from the memory and outputting as coded information.

The compressing unit may also convert the output information from the memory into coded information containing a character and number or bar code type digital information, and output the converted information.

The coded information containing a character and number may be expressed by a base-10+n (n is an integer of 1 or more) number.

A communication system for the maintenance of an image forming apparatus according to the present invention comprises the image forming apparatus having a printing unit for printing out data on the basis of given information, and a service provider's apparatus for receiving information for use in maintenance of the image forming apparatus, wherein the image forming apparatus comprises a memory for storing information for use in the maintenance of the image forming apparatus, a capacity determination unit for, when a use capacity of the memory has reached a predetermined value, notifying the memory of information representing that the use capacity has reached the predetermined value and instructing the memory to output the stored information, and a compressing unit for compressing the output information from the memory and outputting as coded information, and the service provider's apparatus comprises information storage means for sequentially receiving and storing the coded information.

The printing unit of the image forming apparatus may also print the coded information output from the compressing unit, and output the printed-out sheet, and the service provider's apparatus may further comprise converting means for reading the image information printed on the printed-out sheet, converting the read image into coded information containing a character and number or bar code type digital information, and outputting the converted information, an expanding unit for expanding the compressed character information or the compressed bar code type digital information, and a display unit for displaying the expanded information on a screen or printing out the expanded information.

The image forming apparatus can further comprise a first facsimile unit connected to a communication line to transmit the coded information to the communication line, and the service provider's apparatus can further comprise a second facsimile unit connected to the communication line to receive and output the coded information transmitted from the first facsimile unit, an expanding unit for expanding and outputting the compressed information output from the second facsimile unit, and a display unit for displaying the expanded information on a screen or printing out the expanded information.

The image forming apparatus can further comprise a first server connected to a communication line to transmit the coded information to the communication line, and the service provider's apparatus can further comprise a second server connected to the communication line to receive and output the coded information transmitted from the first server, an expanding unit for expanding and outputting the compressed information output from the second server, and a display unit for displaying the expanded information on a screen or printing out the expanded information.

The printing unit of the image forming apparatus may also print the coded information and output a first printed-out sheet, the image forming apparatus may further comprise converting means for reading and converting information on a second printed-out sheet into first character information, and a setting change unit for changing a set value of the image forming apparatus on the basis of the converted first character information, and the service provider's apparatus may further comprise converting means for reading and converting image information printed on the first printed-out sheet into compressed second information, and outputting the compressed second information, an expanding unit for expanding the compressed second information, a display unit for displaying the expanded second information on a screen or printing out the expanded second information, and a printing unit for outputting the second printed-out sheet containing information which designates a change of a set value of the image forming apparatus.

The image forming apparatus may further comprise a first facsimile unit connected to a communication line to transmit the coded first information to the communication line and receive second information transmitted from the communication line, and a setting change unit for changing a set value of the image forming apparatus on the basis of the received second information, and the service provider's apparatus may further comprise a second facsimile unit connected to the communication line to receive and output the coded first information transmitted from the first facsimile unit, and transmit the second information designating a change of a set value of the image forming apparatus, an expanding unit for expanding and outputting the coded compressed first information output from the second facsimile unit, and a display unit for displaying the expanded first information on a screen or printing out the expanded first information.

The image forming apparatus may further comprise a first server connected to a communication line to transmit the coded first information to the communication line, and receive the second information transmitted from the communication line, and a setting change unit for changing a set value of the image forming apparatus on the basis of the received second information, and the service provider's apparatus may further comprise a second server connected to the communication line to receive and output the coded first information transmitted from the first server, and transmit the second information designating a change of a set value of the image forming apparatus, an expanding unit for expanding and outputting the coded compressed first information output from the second server, and a display unit for displaying the expanded character information on a screen or printing out the expanded character information.

A maintenance service method of an image forming apparatus which prints out data on the basis of given information, comprising the steps of storing information for use in maintenance of the image forming apparatus into a memory, causing the memory to output the stored information when a use capacity of the memory has reached a predetermined value, and compressing the output information from the memory and outputting the compressed information as coded information.

A method by which a service provider provides a maintenance service to an image forming apparatus, comprising the steps of storing information for use in maintenance of the image forming apparatus into a memory, causing the memory to output the stored information when the use capacity of the memory has reached a predetermined value, and compressing the output information from the memory and outputting the compressed information as coded information, on the user side, and sequentially storing the coded information, on the service provider side.

The method may further comprise the steps of printing the compressed coded information by using the printing unit, and reading the image information printed on the printed-out sheet, converting the read information into compressed character information or compressed bar code type digital information, and outputting the converted information, on the user side, and expanding the compressed character information or the compressed bar code type digital information, and displaying the expanded information on a screen or printing out the expanded information, on the service provider side.

The method can further comprise the steps of transmitting the coded information to a communication line by using a first facsimile unit, which is connected to the communication line, of the image forming apparatus, on the user side, and receiving the coded information transmitted from the first facsimile unit by using a second facsimile unit connected to the communication line, expanding the compressed information received by the second facsimile unit, and displaying the expanded information on a screen or printing out the expanded information, on the service provider side.

The method can further comprise the steps of transmitting the coded information to a communication line by using a first server connected to the communication line, on the user side, and receiving the coded information transmitted from the first server by using a second server connected to the communication line, expanding the compressed information received by the second server, and displaying the expanded information on a screen or printing out the expanded information, on the service provider side.

The method may further comprise the steps of printing the coded information and outputting a first printed-out sheet by using the printing unit, reading and converting information on the first printed-out sheet into first information, and outputting the first information, and changing a set value of the image forming apparatus on the basis of the first information, on the user side, and reading image information printed on the first printed-out sheet and converting the image information into compressed second information, expanding the compressed second information, displaying the expanded second information on a screen or printing out the expanded second information, and outputting a second printed-out sheet containing information which designates a change of a set value of the image forming apparatus, on the service provider side.

The method may further comprise the steps of transmitting the coded first information to a communication line, and receiving second information transmitted from the communication line, by using a first facsimile unit connected to the communication line, and changing a set value of the image forming apparatus on the basis of the received second information, on the user side, and receiving the coded first information transmitted from the first facsimile unit, and transmitting the second information which designates a change of a set value of the image forming apparatus, by using a second facsimile unit connected to the communication line, expanding the coded compressed first information received by the second facsimile unit, and displaying the expanded first information on a screen or printing out the expanded first information, on the service provider side.

The method can further comprise the steps of transmitting the coded first information to a communication line, and receiving second information transmitted from the communication line, by using a first server connected to the communication line, and changing a set value of the image forming apparatus on the basis of the received second information, on the user side, and receiving the coded first information transmitted from the first server, and transmitting the second information which designates a change of a set value of the image forming apparatus, by using a second server connected to the communication line, expanding the coded compressed first information received by the second server, and displaying the expanded first information on a screen or printing out the expanded first information, on the service provider side.

According to the present invention, there is provided a computer-readable storage medium storing information for use in maintenance of an image forming apparatus.

The information may contain information concerning an operation log of the image forming apparatus, information concerning the setting of the image forming apparatus, and information concerning a paper jamming occurrence portion.

The information may be stored as compressed coded information.

BRIEF DESCRIPTION OF THE DRAWINGS

FIG. 19 is a view for explaining an operation log as practical information to be used in maintenance; and FIG. 20 is a view for explaining information concerning various set values as practical information to be used in maintenance.

DESCRIPTION OF THE PREFERRED EMBODIMENTS

Figure 1:
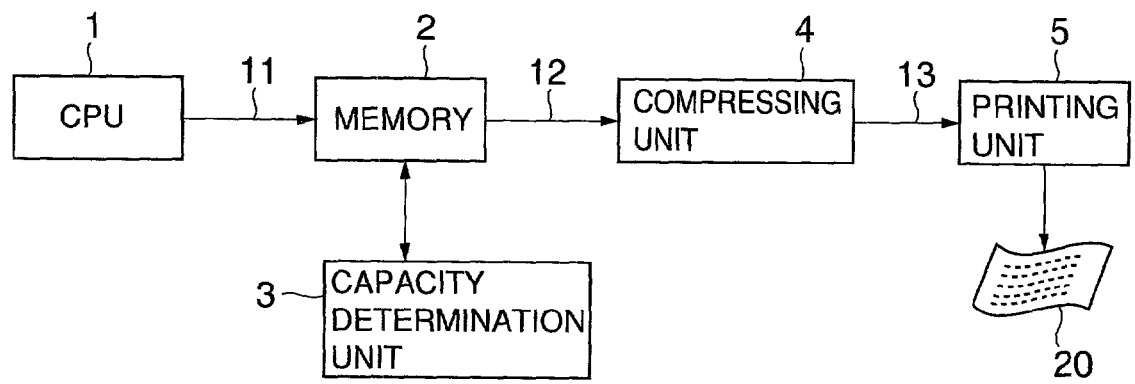
FIG. 1 is a block diagram showing the arrangement of a user's image forming apparatus, when this user's image forming apparatus is not connected to a service provider's apparatus, according to an embodiment of the present invention.

Embodiments of the present invention will be described below with reference to the accompanying drawings.

In each embodiment of the present invention, regardless of whether or not an image forming apparatus of the embodiment is connected to a network, information to be used in maintenance is transferred to a maintenance service provider by using a commonly used means such as a common telephone line or mail, without using any special storage means or communicating means. By analyzing this information, the maintenance service provider can predict maintenance part replacement timings, analyze details to the occurrence of paper jamming, predict failures which easily occur in accordance with use conditions unique to the user, and reserve parts by predicting failures. That is, the maintenance service provider can take optimum actions at optimum timings.

A function which allows periodic transmission, from a user to a service provider, of machine status information, use log information, and the like to be used in the maintenance of an image forming apparatus is an optional function for the user, which is not an original image forming function. Therefore, it is difficult to install expensive parts, systems, and communication equipment at the user's expense.

To transmit information by using the existing information transmission method, therefore, even when communication equipment is not directly connected to an image forming apparatus, the form of output information from the image forming apparatus is once converted by some converting means, and the information is transmitted by using a general information transmission method. A service provider restores the original state of the received data and uses the data in maintenance service.

As the information transmission system, a common system such as mail or a telephone line is used.

To protect maintenance information from being leaked to or altered by the third party, the maintenance information is converted into coded information which is difficult or impossible to interpret by the third party. In addition, this information is a text code or a bar code made up of numbers and alphabets, so that the information is well resistant to, e.g., contamination or noise when printed on a paper surface.

The present invention includes not only a case in which the apparatus is not at all connected to any communication network, but also a case in which an image forming apparatus is connected to a LAN (Local Area Network). Even in a case like this, no mail address independent of original functions of the image forming apparatus is necessary. For example, assuming this image forming apparatus is a LAN printer, information can be transferred to a service provider as long as an IP address required for normal operations as a printer is available.

Also, data such as machine status information and use log information is stored in an image forming apparatus, but these pieces of information require a large capacity. However, a large-capacity memory is expensive.

Accordingly, an inexpensive small-capacity memory is used. When the information storage amount reaches, e.g., 90% of the memory capacity, information is output outside the apparatus to reset the memory, and new information is written, thereby preventing capacity insufficiency of the memory.

Furthermore, when analyzing supplied information and detecting the state of a user's image forming apparatus, a service provider sometimes determines that various set values should be changed. In this case, the service provider sends to the user information concerning changes of set values by mailing a printed sheet of paper, by FAX transmission, or by electronic data transmission across a network. The user converts the image information sent by mail or FAX transmission into character information by OCR conversion using a scanner, and loads this character information into the image forming apparatus. Alternatively, the user receives the electronic data by a computer connected to the network and inputs the received data to the image forming apparatus. This information contains data serving as a trigger for permitting the image forming apparatus to automatically activate a setting change sequence. This data automatically activates the setting change sequence to change various set values in the image forming apparatus.

The output information from the user's image forming apparatus desirably contains the following:

(a) Coded data to be used in maintenance (b) Document I (which informs a user that data (a) represents an operation log and the like and is effective in maintenance service, so it is recommended to save this data without discarding it)

(c) Document II (which informs a user that transmitting to the FAX number or mailing to the mail address of the service provider mentioned (the receiving side is charged in either case) is useful for predictive maintenance, and the service improves)

When reading these documents I and II, the user is highly likely to send by FAX transmission or mail a printed-out sheet on which the coded data is printed, or at least save the data without discarding it.

In particular, when the image forming apparatus does not properly operate, the user voluntarily sends the printed-out sheet by FAX transmission or mail at high possibility.

Note that even if the user loses the coded information for maintenance, the maintenance service can be performed. However, more appropriate steps can be taken with the information.

The form of the coded data will be described below.

Pieces of information for use in maintenance, e.g., status information, setting information, operation log information, and error log information of an image forming apparatus are expressed by decimal numbers with breaks. These decimal numbers are converted into base-32 numbers which represent data by combining numbers 0 to 9 and alphabets A to V, and a predetermined mark is inserted in each break (e.g., "#" is inserted to represent a delimiter between information contents, and "+" is inserted to represent a delimiter between sequences or items). By the use of this method, maintenance information which is often long can be shortened.

The information can be further shortened by using base-64 numbers by combining 0 to 9, A to Z, a to z, and symbols such as $ and %.

Furthermore, the information can also be expressed by the realization of base-128 numbers by adding 52 half-sized katakana characters and various symbols such as "-, *, /, ¥, and @". This can further shorten the information.

Note that base-16, base-32, base-64, and base-128 numbers are used as examples, but the present invention is not limited to these methods. For example, any method such as base-50 or base-100 numbers capable of compressing information by using numbers, characters, and symbols can be applied to coding of the present invention.

Also, the information coded as described above can also be expressed as follows as bar code type digital data other than characters and numbers.

When the image information is constructed as this bar code type digital data, no OCR means for reading this image information is necessary, unlike in the case of character information. Since this simplifies the arrangement of the entire apparatus, the cost can be reduced. However, the code description length often increases. Accordingly, it is desirable to summarize and arrange the contents of description to prevent an excessively large output information amount. From this viewpoint, coded information using numbers and characters often shortens the overall description length and hence is suited to outputting a large amount of information by compressing it.

The process of transferring information from a user to a service provider has been described above. By using output information from a user's image forming apparatus, the conditions of this apparatus can also be set (e.g., the conditions can be reset to initial values). When this is the case, the image forming apparatus is so configured that output information is read by a scanner, and an operation procedure necessary for the user is displayed on an operation panel. When information is to be printed out from the apparatus, the following document is added to the information.

"To improve our maintenance service, read this coded information by a scanner, check the information appearing on your operation panel, and select an icon to be started. This optimizes the condition setting of the apparatus.

Please contact the following service station for further information.

Service station 044-548-++**## Toshiba Copying Machine Service Provider 70, Yanagimachi, Saiwai-ku, Kawasaki City"

When a user's image forming apparatus is not connected to a network, a printed-out sheet output from the image forming apparatus is sent by mail or manually sent by FAX transmission. On the other hand, an image forming apparatus sometimes has a FAX function and is connected as a FAX apparatus to a telephone line.

In this case, the coded information is automatically transmitted to the FAX number of a service provider previously set in the FAX function, without printing out the information from the image forming apparatus or waiting for operations by the user.

If the service provider has an apparatus capable of receiving the information sent by FAX transmission and storing the information in the form of electronic data, the information is received and stored in a database at appropriate timings. If the service provider has no such apparatus, the received information is printed out and stored in the conventional manner.

Also, a user's image forming apparatus is in some instances connected to an external system across a LAN. In this case, the coded information is converted into a predetermined file format or packet format and automatically transferred periodically to a service station's computer address by using ftp (file-transport-protocol) or the like, without any user's operations.

If data transfer fails, the operation is switched to a method for a standalone type image forming apparatus, and the coded information and documents I and II are printed out. The user is prompted to send the printed data to the service provider by mail or by manual FAX transmission.

The arrangements of a user's image forming apparatus and a service provider's apparatus for receiving information, when the user's image forming apparatus and a service provider's computer or the like are not connected by a network or the like, will be described below with reference to the accompanying drawings.

FIG. 1 shows the arrangement of the user's image forming apparatus. This image forming apparatus includes a copying machine, printer, or the like.

A central processing unit (to be referred to as a CPU hereinafter) 1 controls printing operation and the like of the whole apparatus. In this embodiment, the CPU 1 transfers information 11 for use in maintenance to a memory 2. This information 11 includes, e.g., apparatus setting information, status information (status log), error information concerning a paper jamming occurrence portion or the like, an operation log, a part exchange warning, and necessary maintenance messages.

The memory 2 is a rewritable memory such as a RAM (Random Access Memory) and is preferably a detachable storage. This memory 2 stores the information 11 given by the CPU 1.

A capacity determination unit 3 detects the use ratio of the memory 2. If stored information reaches a predetermined ratio (e.g., 90%) of the capacity allocated to storage, the capacity determination unit 3 notifies the memory 2 of this information and instructs the memory 2 to output the stored information.

When thus instructed to output the stored information by the capacity determination unit 3, or when the user instructs the memory 2 to output the stored information by selecting an operation menu of the apparatus, the memory 2 outputs and transfers stored information 12 to a compressing unit 4.

The compressing unit 4 compresses the output information 12 from the memory 2 into coded information 13 by using, e.g., base-32 notation (to be described later), and outputs this coded information 13 to a printing unit 5.

This printing unit 5 has a printing function normally installed in an image forming apparatus. The printing unit 5 prints out the coded information 13 onto a sheet of paper.

The information printed on the paper surface is a list of at least the apparatus identification number, error information, operation log information, and apparatus status information, in the form of a text code including numbers or alphabets. This information can also be bar code type digital data.

Since the compressing unit 4 compresses the information, it is possible to reduce the number of printing sheets and the cost. Also, since the printed contents are coded, the contents are not interpreted by the third party. This can prevent a leakage of secrets.

Figure 2:
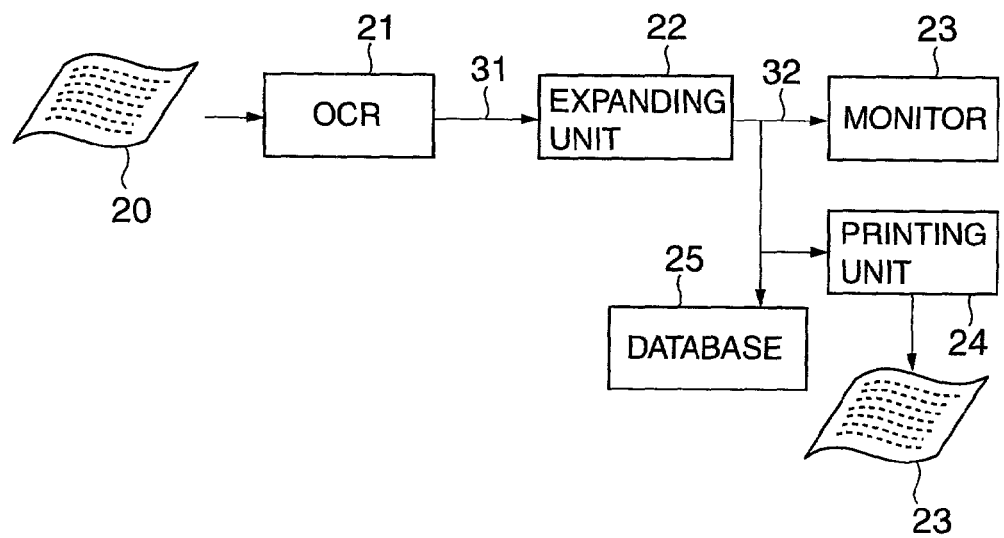
FIG. 2 is a block diagram showing the arrangement of a service provider's apparatus, when a user's image forming apparatus is not connected to this service provider's apparatus, according to an embodiment of the present invention.

FIG. 2 shows the arrangement of the apparatus of the service provider which has received a printed sheet 20. The image information printed on the sheet 20 is given as it is sent by mail from the user to the service provider or transmitted by FAX transmission to the receiving (printing) apparatus of the service provider.

An OCR unit 21 reads this image information printed on the sheet 20 and outputs it as character information 31.

This character information 31 is compressed as described above. An expanding unit 22 expands this compressed information to restore uncompressed information 32, thereby obtaining electronic data (file).

A monitor 23 displays the output information 32 from the expanding unit 22 on the screen, or a printing unit 24 prints out the information on a sheet 33. The information 32 is also stored in a database 25 and used in analysis.

The above configuration is based on the assumption that the user's image forming apparatus and the service provider's computer or the like are not connected by a network or the like.

In some cases, however, a user's image forming apparatus has a FAX function, and a service provider's apparatus has a function capable of directly storing information transmitted by facsimile in the form of electronic data. When this is the case, the information 13 from the compressing unit 4 is output to a FAX transmitter (not shown) without being transmitted to the printing unit 5. The FAX transmitter automatically transmits given information 15 by facsimile without waiting for user's operations.

On the service provider side, the information 15 is received by a FAX receiver (not shown) without using the OCR unit 21, and output to the expanding unit 22. Processing after that is the same as the above-mentioned processing.

Alternatively, a user's image forming apparatus is sometimes connected in series to a service provider's computer via a telephone line. In this case, the information 13 from the compressing unit 4 is output to a transmitter (not shown) without being transmitted to the printing unit 5. The transmitter automatically transmits given information 15 via the telephone line.

On the service provider side, the information 15 is received by a receiver (not shown) without using the OCR unit 21, and output to the expanding unit 22. Processing after that is the same as the above-mentioned processing.

Detailed operation procedures according to this embodiment will be described below.

(1) Setting Operation when Apparatus is Manufactured

In the manufacture of the image forming apparatus, a machine number and the like are set.

Figure 3:
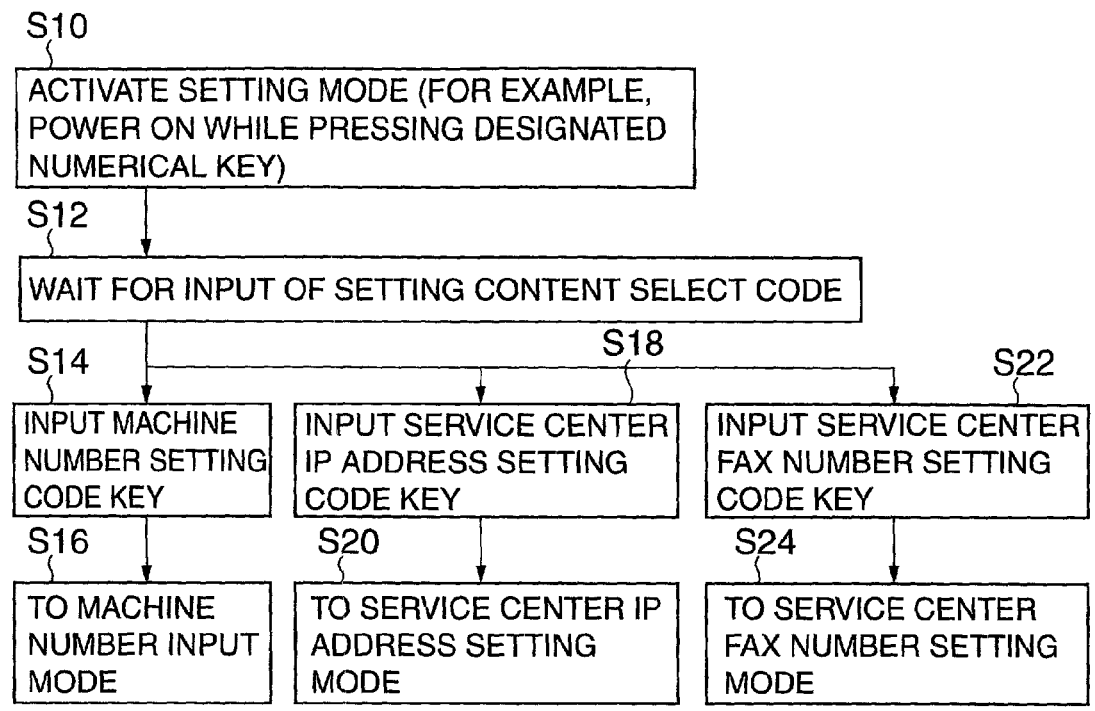
FIG. 3 is a flow chart showing the procedure of setting operation in the manufacture of an image forming apparatus.

As shown in FIG. 3, in step S10 a setting mode is activated. More specifically, a user turns on a power supply while pressing a designated numerical key.

In step S12, input of a setting content code is waited for.

In step S14, input of a machine number code is displayed as a setting content to be selected on the screen of the apparatus. Similarly, input of a service provider IP address setting code is displayed in step S18, and input of a service provider FAX number setting code is displayed in step S22. The user is prompted to select one of them.

If the user selects input of the user machine number setting code, in step S16 the flow advances to a machine number input mode. If the user selects input of the service provider IP address setting code, in step S20 the flow advances to a service center IP address setting code input mode. If the user selects input of the service provider FAX number setting code, in step S24 the flow advances to a service center FAX number setting code input mode.

(2) Machine Number Setting Sequence

A sequence of inputting the machine number is as follows.

Figure 4:
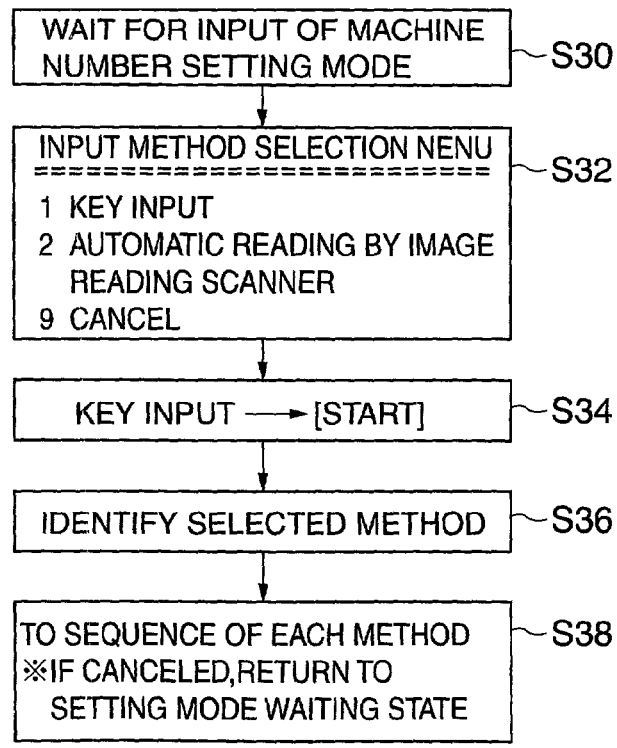
FIG. 4 is a flow chart showing the procedure of setting a machine number in the image forming apparatus.

As shown in FIG. 4, when the flow advances to the machine number input mode, in step S30 a machine number setting mode is set and input is waited for.

In step S32, an input method select menu is displayed on the screen of the apparatus. Input methods include, e.g., a key input method and a method by which information on a paper surface is automatically read and input by an image reading scanner. Input can also be canceled.

In step S34, key input is accepted. In step S36, the selected input method is identified.

In step S38, the flow advances to a sequence corresponding to the selected input method. If the input is canceled, the flow returns to the setting mode waiting state in step S30.

If the service provider IP address setting mode is selected, or if the service provider FAX number setting mode is selected, a setting sequence is performed following a similar procedure.

(3) Key Input Sequence

When the key input sequence is selected, the processing is performed by the following procedure.

Figure 5:
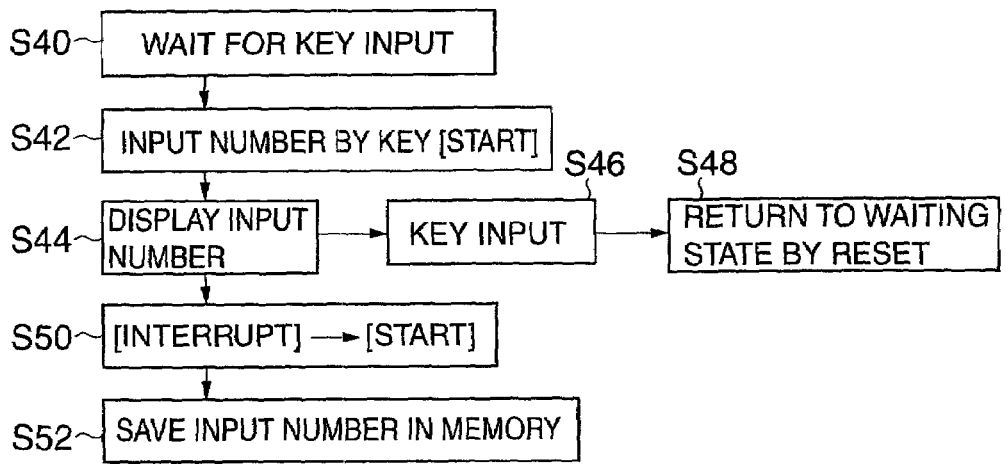
FIG. 5 is a flow chart showing the procedure of inputting a machine number by key input, in the image forming apparatus.

As shown in FIG. 5, in step S40 key input is waited for.

In step S42, a key that is input by the user is accepted.

In step S44, the input number is displayed on the screen of the apparatus. In step S46, the key input is accepted. In step S48, the flow returns to the waiting state by reset.

In step S50, if an interrupt occurs, the interrupt processing is started.

In step S52, the input number is saved in the memory.

(3) Automatic Reading by Image Reading Scanner

When automatic reading by the image reading scanner is selected, the processing is performed by the following procedure.

Figure 6:
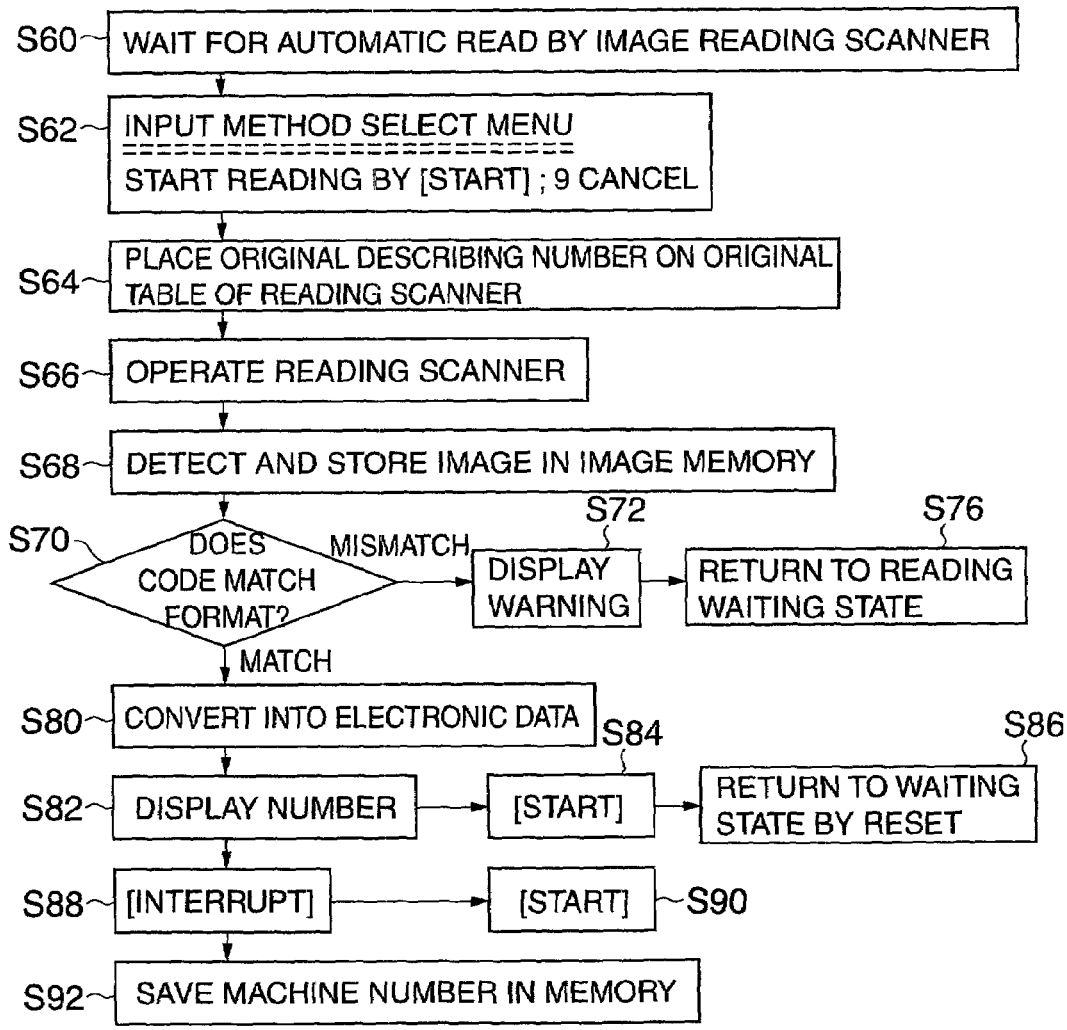
FIG. 6 is a flow chart showing the procedure of inputting a machine number by automatic reading by an image reading scanner, in the image forming apparatus.

As shown in FIG. 6, in step S60 automatic reading by the image reading scanner is waited for.

In step S62, "start" and "cancel" are displayed on the screen, and the user is prompted to select one of them.

If "start" is selected, in step S64 the user makes preparations necessary for reading by the scanner. More specifically, the user places an original which describes a number on an original table of the scanner.

In step S66, reading operation is started. In step S68, an image is detected from the read information and stored as image data in the image memory.

In step S70, whether the read information is a code matching a predetermined format is checked. If mismatch is found, in step S72 a warning is displayed on the screen of the apparatus. In step S76, the flow returns to the reading waiting state.

If the read information is a code matching the predetermined format, in step S80 the code is converted into electronic data.

In step S82, the number is displayed on the screen of the apparatus. If there is no error in the displayed number, in step S84 the user presses a "start" button. In step S86, the flow returns to the waiting state by reset.

If interrupt processing is requested in S88, the user presses the "start" button in step S90.

In step S92, the machine number of the apparatus is stored in the memory. This memory is used to store set values and adjusted values. For example, a RAM is used as the memory.

The procedures of sequentially selecting and inputting the machine number, center computer IP address, and FAX number have been explained. However, it is also possible to set a setting mode by which these pieces of information are simultaneously read and input by the scanner.

In the manufacturing stage, apparatuses for the same destination are usually collectively produced. Accordingly, when a mode like this is set, the machine number, IP address, and FAX number can be successively input, and the efficiency improves.

(4) Sequence of Outputting Apparatus Information Etc.

A sequence of outputting information necessary for maintenance, e.g., apparatus information, is as follows.

Figure 7:
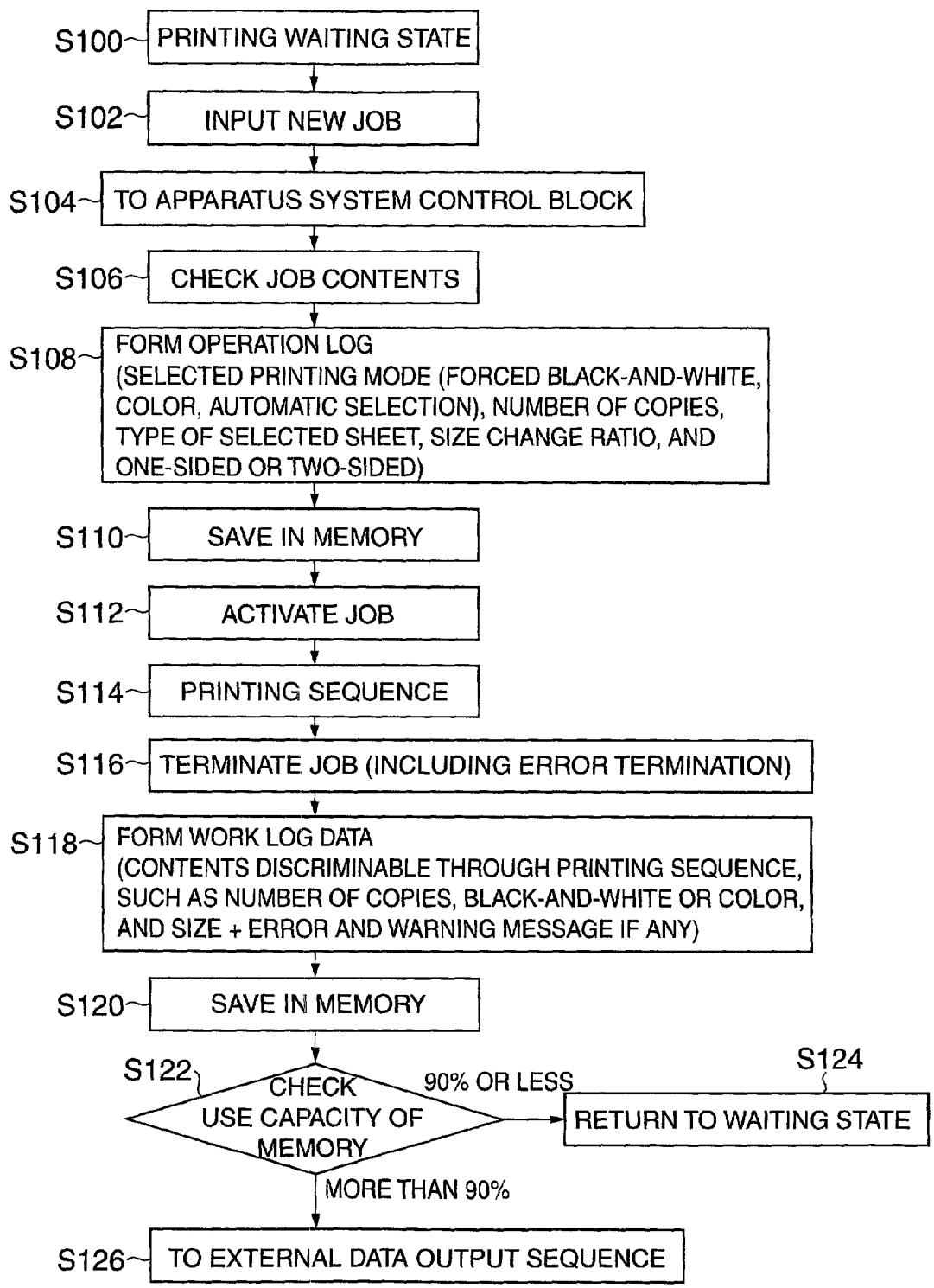
FIG. 7 is a flow chart showing the sequence of outputting apparatus information and the like necessary for maintenance, in the image forming apparatus.

As shown in FIG. 7, in step S100 printing of apparatus information and the like is waited for.

In step S102, a new job is input.

In step S104, the flow advances to a block for performing system control of the apparatus.

In step S106, the contents of the job are checked.

In step S108, operation log information is checked. This operation log information contains a printing mode selected from, e.g., forced black-and-white, color, and automatic selection, the number of copies, the type of selected sheet, a size change ratio, one-sided or two-sided, and the like.

In step S110, the operation log information is saved in the memory. As described earlier, this memory is desirably a detachable memory, e.g., a card type memory, so as to facilitate maintenance.

In step S112, the job is activated. In step S114, the flow advances to a printing sequence.

In step S116, the job is terminated. This termination includes forced termination caused by an error such as paper jamming.

In step S118, work log data is formed. This work log data contains, e.g., the number of copies, black-and-white or color, and size. If there are an error produced by the printing process and a warning message, these pieces of information are also contained.

In step S120, the work log is saved in the memory.

In step S122, the use capacity of the memory is checked. If the use capacity is 90% or less, the flow advances to step S124, and the flow returns to the waiting state in step S100. If the use capacity exceeds 90%, the flow advances to a sequence of outputting the work log in step S126.

(5) Sequence of Manually Printing Out Data

Figure 8:
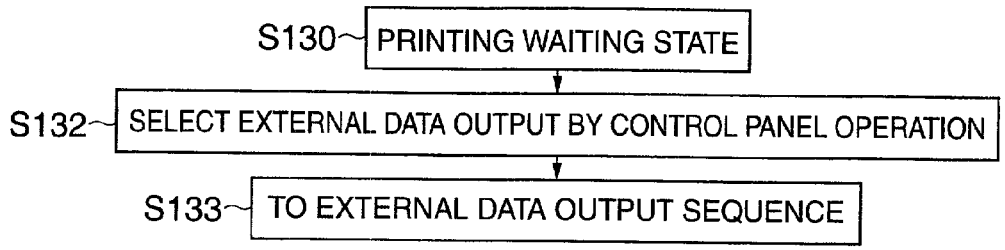
FIG. 8 is a flow chart showing the procedure of manually outputting the information necessary for maintenance.

As shown in FIG. 8, in step S130 a printing waiting state is set.

In step S132, the user operates the control panel to select data output in accordance with the display on the screen of the apparatus.

In step S134, the flow advances to a sequence of outputting data to the outside.

(6) Sequence of Automatically Outputting Data

When the image forming apparatus has a function of automatically outputting data, the following sequence is executed.

Figure 9:
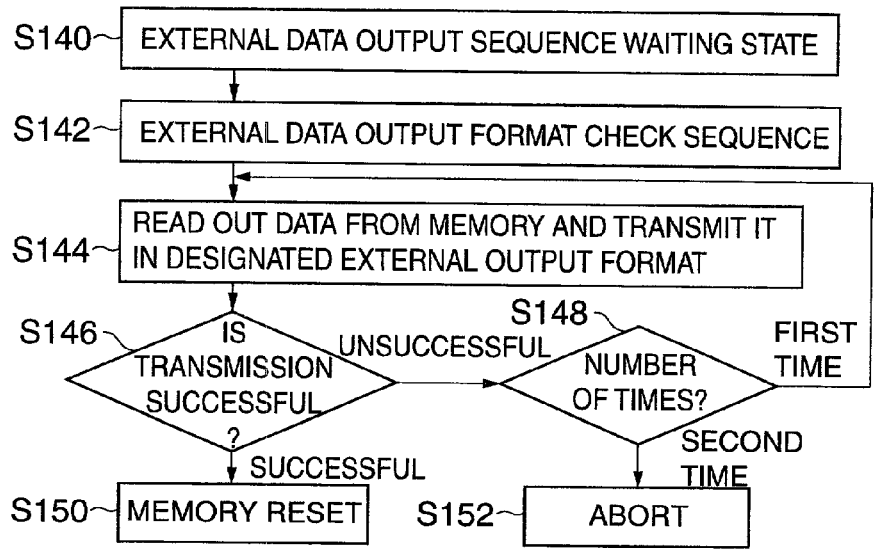
FIG. 9 is a flow chart showing the procedure of automatically outputting the information necessary for maintenance.

As shown in FIG. 9, in step S140 an external data output sequence is waited for.

In step S142, the flow advances to a sequence of checking the output format. The contents of this sequence will be explained in (7) work log external output format check sequence to be described below.

After the output format is checked, data is read out from the memory and automatically transmitted in the designated external output format by facsimile or across a network in step S144.

In step S146, whether the transmission is successful is checked. If the transmission is unsuccessful, in step S148 the number of times of the output is checked. If the output is the first time, the flow returns to step S144 to again output the data. If the output is the second time, the process is aborted in step S152. If the output is successful, the memory is reset in step S150.

(7) Sequence of Checking External Data Output Format

To check the external output format of data in step S142 described above, the following sequence processing is performed.

Figure 10:
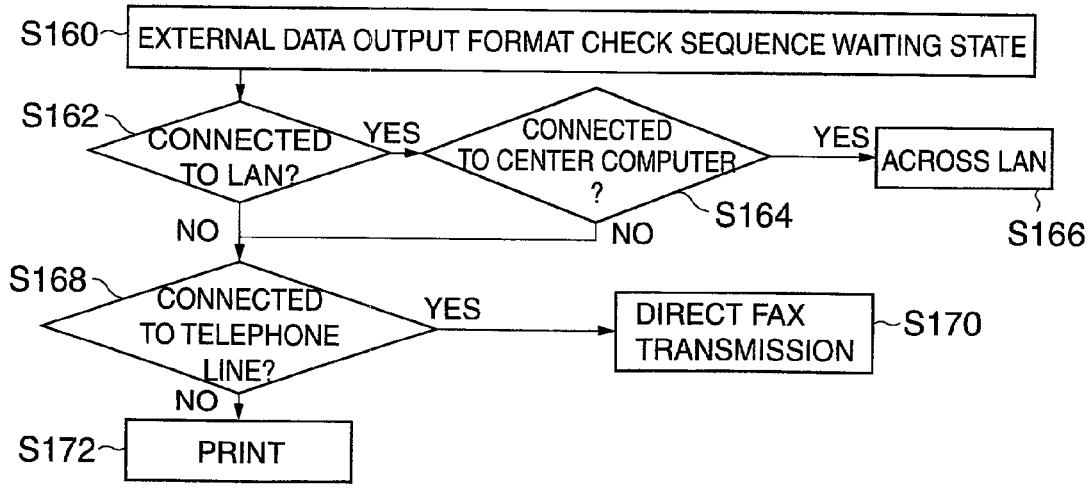
FIG. 10 is a flow chart showing the sequence of checking an external output format.
Figure 11:
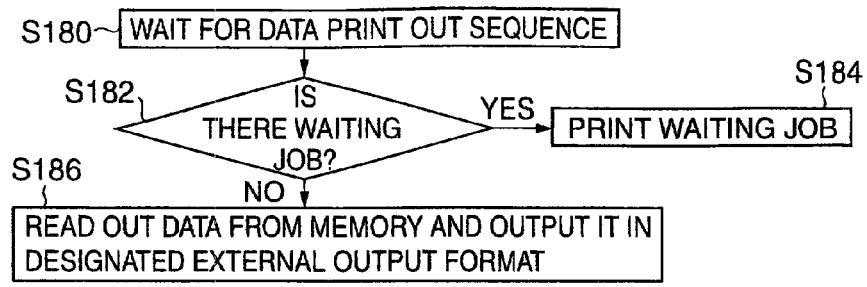
FIG. 11 is a flow chart showing the procedure of self-printing of data.

As shown in FIG. 10, in step S160 a sequence of checking the external output format of data is waited for.

In step S162, whether the apparatus is connected to a LAN is checked. If the apparatus is connected, whether the apparatus is connected to a center computer of the LAN is checked in step S164. If the apparatus is connected, it is determined in step S166 that data is to be output across the LAN. If the apparatus is not connected to a LAN, or if the apparatus is connected to a LAN but is not connected to a service provider's center computer, the flow advances to step S168.

In step S168, whether the apparatus is connected to a telephone line is checked. If the apparatus is connected, data is transmitted to a service provider's facsimile apparatus by automatic FAX transmission in step S170. If the apparatus is not connected to a telephone line, data such as operation log information is converted into coded text information or bar code type digital information and printed out in step S172.

(8) Sequence by Which Image Forming Apparatus Prints Out Data by Itself

When the image forming apparatus is to print out data by itself by using a built-in printing function, the following procedure is performed.

In step S180, a sequence of printing out work log information is waited for.

In step S182, a printing operation is checked to check whether there is a job waiting for printing. If a waiting job is present, the job is printed in step S184.

If there is no waiting job, data is read out from the memory and printed out in the designated external output format in step S186.

(9) Information Transfer Forms between User and Service Provider

The following five types of forms are possible as a method of transferring information from a user's image forming apparatus to a service provider.

(9-1) User's Image Forming Apparatus not Connected to Service Provider's Computer In this case, the user's image forming apparatus is a common copying machine or is a standalone type printer not connected to a LAN.

Information to be used in maintenance is periodically printed out from the image forming apparatus, and the user keeps the printed sheets. The service provider periodically visits the user and provides a service such as maintenance by using the compressed information printed on the sheets.

(9-2) User's Image Forming Apparatus not Connected to Service Provider's Computer Information such as an operation log is periodically printed out from the image forming apparatus and sent by mail. The service provider stores the information thus sent. The service provider visits the user by carrying this information and provides a service such as maintenance by using the information.

(9-3) User's Image Forming Apparatus not Connected to Service Provider's Computer Information such as an operation log is periodically printed out from the image forming apparatus and transmitted by facsimile by using a FAX terminal different from the image forming apparatus. The service provider stores the information received by facsimile. The service provider visits the user by carrying this information and provides a service such as maintenance by using the information.

(9-4) User's Image Forming Apparatus Which Incorporates FAX Function and is Connected to Service Provider's FAX Apparatus via Telephone Line The image forming apparatus periodically transmits information such as an operation log automatically by facsimile. The service provider stores the information received by facsimile in the form of electronic data. The service provider visits the user by carrying this information and provides a service such as maintenance by using the information.

(9-5) User's Image Forming Apparatus Connected to Service Provider's Computer via LAN, Telephone Line, or the Like The image forming apparatus periodically transfers information such as an operation log directly to the service provider's computer. The service provider loads the transferred information into the computer and stores in a database. The service provider visits the user by carrying this information and provides a service such as maintenance by using the information.

Data transfer in each of the above forms will be described below with reference to the accompanying drawings.

(9-2 & 9-3) User's Image Forming Apparatus Disconnected from Network

Figure 12:
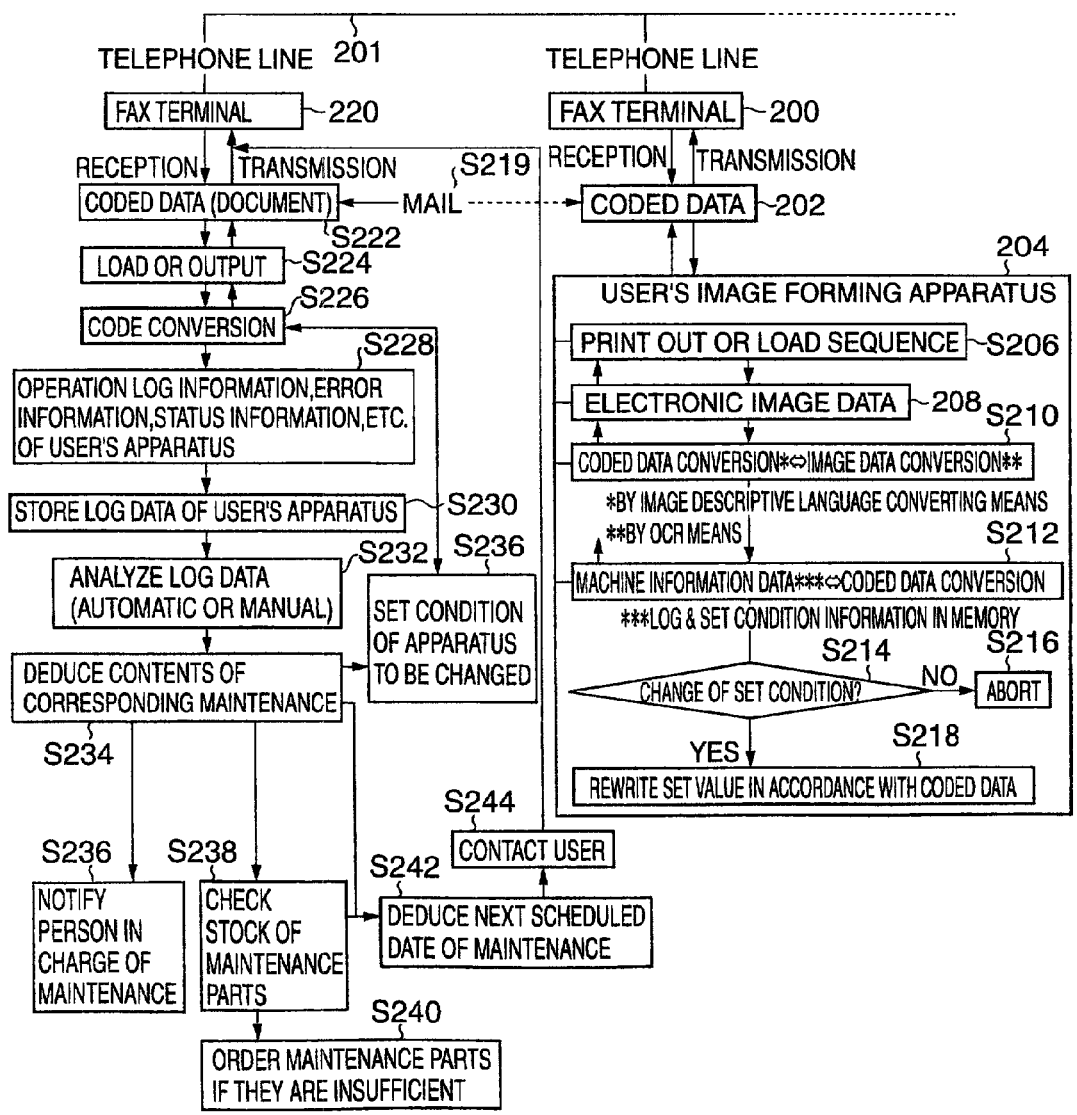
FIG. 12 is a block diagram showing the whole configuration of a communication system, when a user s apparatus and a service provider's apparatus are not connected, according to an embodiment of the present invention.

As shown in FIG. 12, in a user's image forming apparatus 204, information (machine information data 212) stored in a memory such as a RAM and pertaining to the apparatus status and error is converted into coded data (image electronic data 208) in step S210 and printed out in step S206.

In mail S219, output coded data 202 is mailed in the form of a document to a service provider, or received by a service provider's FAX terminal 220 via a user's FAX terminal 200 and a telephone line 201 and printed out.

In step S224, coded data 222 transferred in the form of a document to the service provider is read by a scanner or the like. In step S226, the read data is converted into, e.g., the operation log information, error information, and status information of the user's image forming apparatus by a code converting means. In step S230, these pieces of information are stored as log data 228.

In step S232, the stored log data is automatically analyzed by a predetermined analyzer or manually analyzed. In step S234, corresponding maintenance is deduced.

In step S236, a person in charge of maintenance is informed in accordance with the deduced result. In step S238, the stock of necessary maintenance parts is checked. If the stock is insufficient, these parts are ordered instep S240. Instep S242, the next scheduled date of maintenance is set and notified to the user via the FAX terminal 220, the telephone line 201, and the FAX terminal 200.

If, as a result of the deduction of the maintenance contents, the set conditions of the apparatus are to be changed in step S236, the contents are converted into the coded data 222 and printed out in step S226. The output coded data is printed out by the user via the FAX terminal 220, the telephone line 201, and the FAX terminal 200, or mailed to the user in step S219.

By using the coded data 202 printed out from the FAX terminal 200 or the coded data 202 sent by mail, the user changes the set conditions of the image forming apparatus in accordance with the operation manual.

First, in step S206, the coded data on the printed sheet is loaded by a scanner. In step S210, the loaded data is converted into electronic image data by using an OCR means, obtaining coded data 212 concerning information of the set conditions. In step S214, whether a code for changing the setting of the conditions is present is checked. If this code is present, the contents of the memory are rewritten in step S218. If no such code is present, the processing is aborted in step S216.

Figure 13:
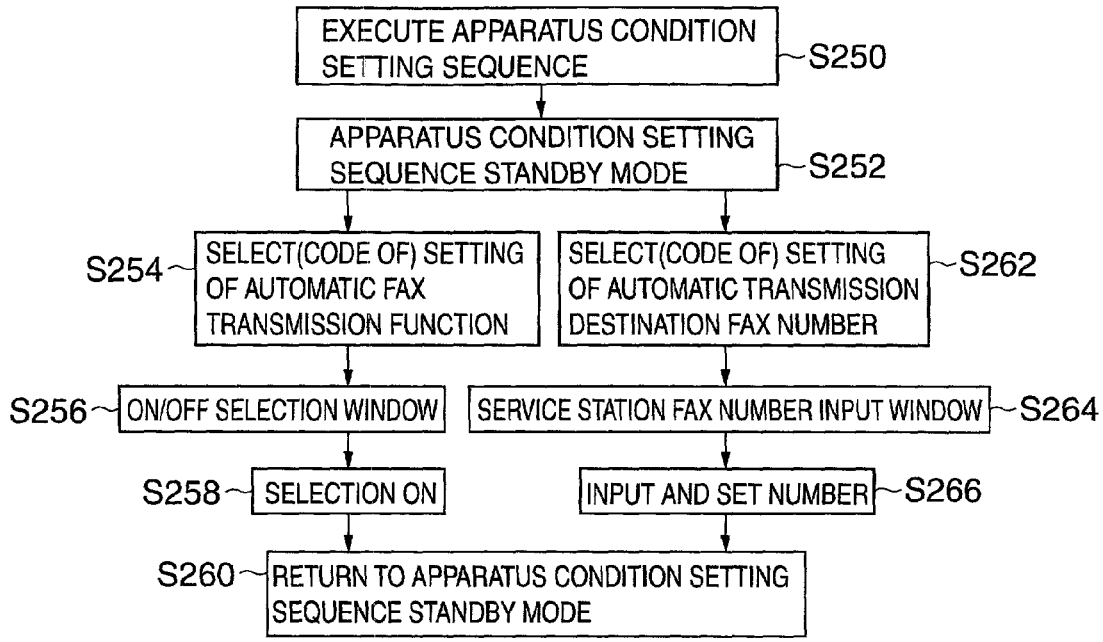
FIG. 13 is a flow chart showing the sequence of setting conditions of automatic FAX transmission from the user's apparatus to the service provider's apparatus.

(9-4) User's Image Forming Apparatus which has FAX Function and is Connected to Service Provider's FAX Terminal via Telephone Line (9-4-1) Setting of FAX Number for Automatic FAX Transmission As shown in FIG. 13, the FAX number of the service provider's FAX terminal is set by the following procedure in a FAX unit of the user Is image forming apparatus. It is desirable to so set that the receiving side bears the charge.

In step S250, the execution of an apparatus condition setting sequence is started.

In step S252, the apparatus condition setting sequence enters a standby mode.

Henceforth, two processes must be performed. First, in step S254, the user selects a code for setting a function of performing automatic FAX transmission from a menu on the screen of the apparatus.

In step S256, an automatic FAX transmission ON/OFF select menu is displayed on the screen. In step S258, the user selects ON. In step S260, the flow returns to the apparatus condition setting sequence standby mode.

Next, in step S262, the user selects a window for setting the FAX number for automatic FAX transmission.

In step S264, the window for inputting the service provider's FAX number is displayed. In step S266, the FAX number is input and set. After that, the flow returns to the standby mode in step S260.

(9-4-2) Automatic FAX Transmission

By using the set FAX number, the built-in FAX unit of the user's image forming apparatus automatically transmits information such as the apparatus status to the service provider's FAX terminal by facsimile. If transmission is impossible owing to, e.g., an operation error of the FAX terminal, the information is printed out as usual and transmitted by facsimile by using a FAX terminal different from the image forming apparatus.

Figure 14:
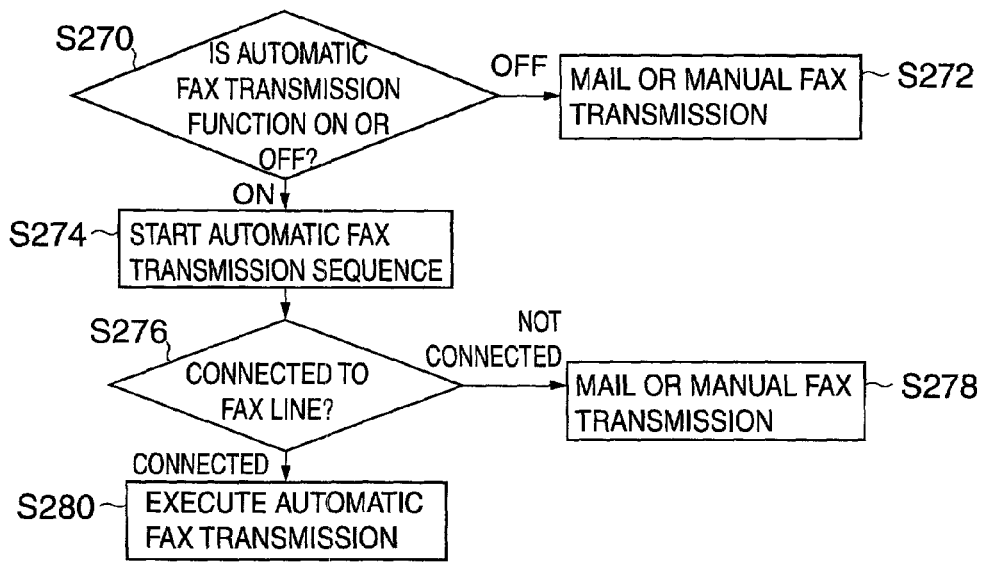
FIG. 14 is a flow chart showing the sequence of automatic FAX transmission from the user's apparatus to the service provider's apparatus.

As shown in FIG. 14, whether the automatic FAX transmission function is ON or OFF is checked in step S270.

If this function is OFF, the information is printed out as usual and mailed or manually transmitted by facsimile in step S272. If this function is ON, an automatic FAX transmission sequence is started from step S276.

In step S276, the connection of the FAX line is checked. If the line is not connected, the information is printed out as usual and mailed or manually transmitted by facsimile in step S278. If the line is connected, automatic FAX transmission is executed in step S280.

When the information is automatically transmitted from the user's image forming apparatus to the service provider's FAX terminal by facsimile, this information is directly stored in the memory in the form of electronic data if the service provider's FAX terminal has a function of storing the information. If no such function is available, the information is printed out as in common FAX reception.

Figure 15:
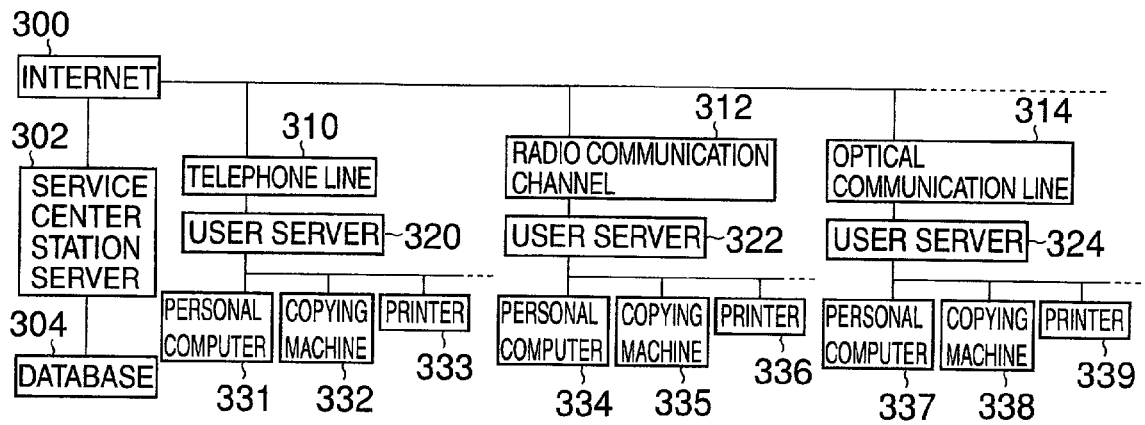
FIG. 15 is a block diagram showing the whole configuration of a communication system, when users' apparatuses and a service provider's apparatus are connected across the Internet, according to an embodiment of the present invention.

(9-5) User's Image Forming Apparatus Connected to Service Provider's Computer via LAN, Telephone Line, or the Like FIG. 15 shows an arrangement in which a plurality of user's image forming apparatuses are connected to a service provider's computer across, e.g., the Internet.

A plurality of users have, as image forming apparatuses, copying machines 332, 335, and 338 and printers 333, 336, and 339 connected to personal computers 331, 334, and 337, respectively. These apparatuses are connected to the Internet 300 via user servers 320, 322, and 324, a telephone line 310, a radio communication channel 312, and an optical communication line 314. A service provider's station server 302 is connected to the Internet 300. This station server 302 is connected to a dedicated database 304 for storing information necessary for maintenance, such as apparatus status information.

With this system configuration, file type or packet type electronic data containing coded data of, e.g., apparatus status information can be automatically transmitted from the user server to the IP address of the station server by using a data transfer means such as ftp. This improves the transfer efficiency.

Practical process procedures of this data transfer will be explained below with reference to the accompanying drawings.

(9-5-1) Setting of Automatic Transmission Destination Address

To automatically transmit the apparatus status information and the like across the Internet from the user server to the station server, the address of the transmission destination must be set on the user side.

Figure 16:
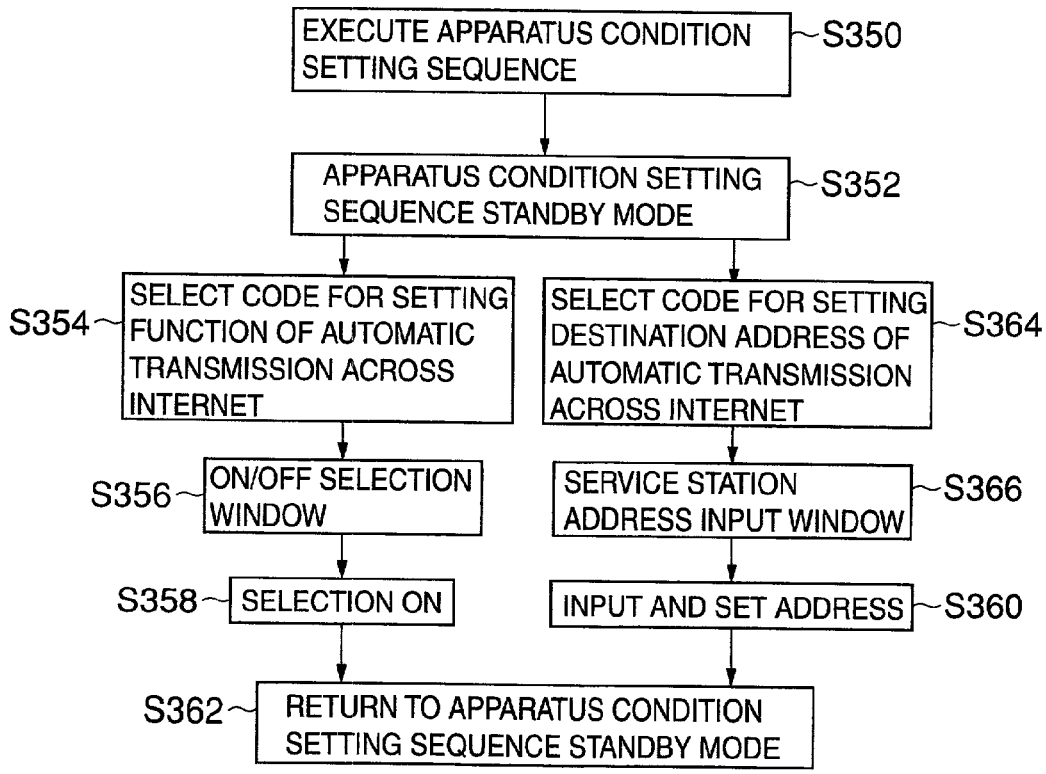
FIG. 16 is a flow chart showing the sequence of setting conditions of automatic transmission across the Internet from the user's apparatus to the service provider's apparatus.

As shown in FIG. 16, the flow enters the execution of an apparatus condition setting sequence in step S350.

In step S352, the flow enters an apparatus condition setting sequence standby mode.

In step S354, the user selects a code number for setting a function of automatically transmitting the apparatus information across the Internet.

In step S356, a window for selecting ON or OFF of this automatic transmission is displayed. In step S358, the user selects ON. In step S362, the flow returns to the apparatus condition setting sequence standby mode.

In step S364, the user inputs a code number for displaying a window for setting a transmission destination address when the apparatus information is to be automatically transmitted across the Internet.

Consequently, in step S366, the window for inputting the address of the station server is displayed. In step S360, the user inputs and sets the address. The flow then advances to step S362 to return to the apparatus condition setting sequence standby mode.

(9-5-2) Automatic Transmission Process Start

After the setting of the address of the automatic transmission destination is completed, setting necessary to automatically transmit information for use in the maintenance of the image forming apparatus from the user server to the service station server is performed.

Figure 17:
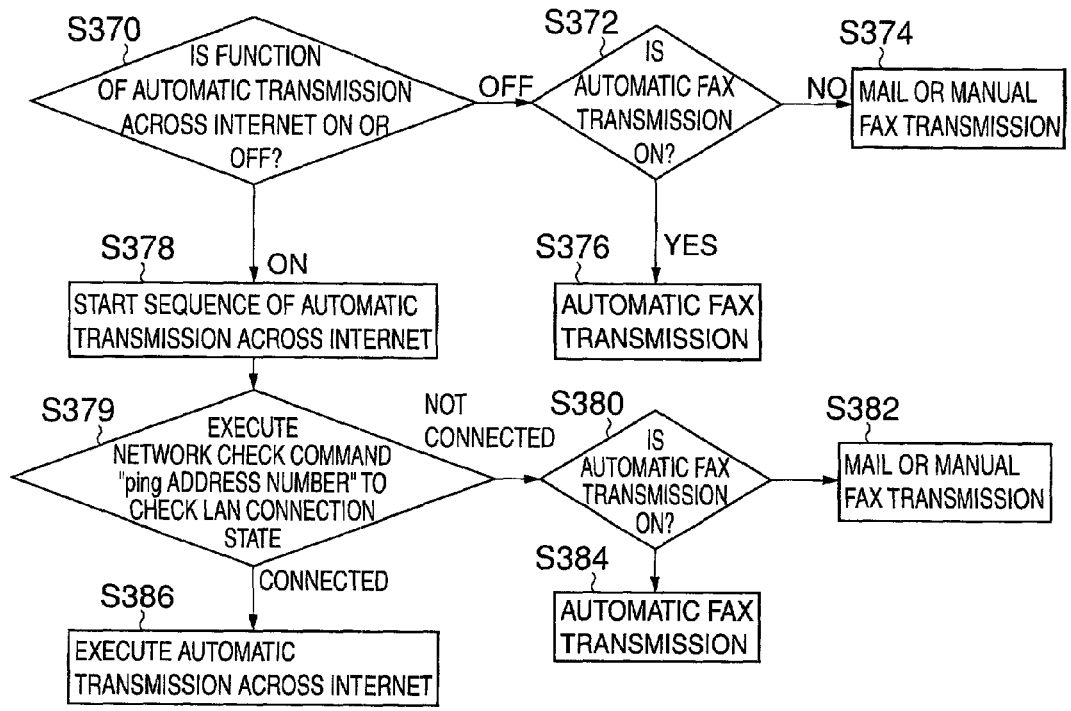
FIG. 17 is a flow chart showing the sequence of automatic transmission across the Internet from the user's apparatus to the service provider's apparatus.

As shown in FIG. 17, whether a function of automatically transmitting the apparatus information across the Internet is ON is checked in step S370. If this function is OFF, in step S372 whether a function by which a built-in FAX unit of the user's apparatus performs automatic FAX transmission for a service station's FAX terminal is ON is checked. If this function is ON, in step S376 automatic FAX transmission is performed. If this function is OFF, in step S374 the apparatus information is printed out by the user's image forming apparatus and manually transmitted from the FAX terminal or mailed.

If the function of automatic transmission across the Internet is ON, an automatic transmission sequence is started in step S378.

In step S379, whether the user server is connected to a LAN is checked. This can be done by executing a network command "ping address number".

If no connection is detected, whether the function by which the built-in FAX unit of the user's apparatus performs automatic FAX transmission for the service station's FAX terminal is ON is checked in step S380. If this function is ON, automatic FAX transmission is performed in step S348. If the function is OFF, the apparatus information is printed out by the user's image forming apparatus and manually transmitted from the FAX terminal or mailed in step S382.

If the user server is connected to a LAN, automatic transmission is executed across the Internet in step S386.

(9-5-3) Automatic Transmission Process

Automatic transmission from the user server to the service station server is executed by the following practical operation procedure.

Figure 18:
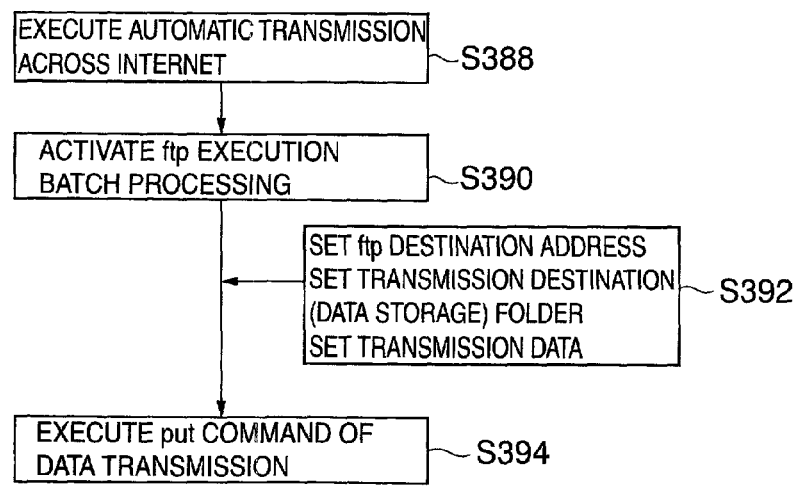
FIG. 18 is a flow chart showing practical operations of automatic transmission across the Internet from the user's apparatus to the service provider's apparatus.

As shown in FIG. 18, in step S388, the flow advances to the execution of automatic transmission.

In step S390, ftp execution batch processing is activated. In step S392, an ftp destination address is set, a transmission destination, i.e., a folder of a data storage destination is set, and data to be transmitted is set.

In step S394, automatic transmission is performed by executing a data transmission put command.

(10) Data Processing by Service Provider

The information to be used in the maintenance of the user's image forming apparatus is sent to the service provider by any of the abovementioned methods. A sequence of data processing performed by the service provider will be described next.

If the received data is the printout from the FAX terminal or image information formed on the printed-out sheet sent by mail, the service provider returns the data to electronic text code data by using a bar code reader when the data is bar code information or by using an OCR means when the data is a character code. If the data sent from the user is electronic data by automatic FAX transmission or transmission across the Internet, an electronic text data portion contained in this data is extracted.

The information sent from the user contains operation log information shown in FIG. 19 and various pieces of set value information shown in FIG. 20 in addition to the machine number:

Operation recording period

Operation log information (e.g., color or black-and-white, size, paper feed means, number of copies, finishing setting, and printing set conditions)

Error log information (e.g., error code for daily error such as paper jamming occurrence position, and maintenance call code)

Apparatus status information (density γ adjusting value, various correction values for temperature and humidity, developing agent density value, number of copies, and number of copies of each of color and black-and-white)

Various set condition values (e.g., motor set value, reading position correction value, fixing temperature set value, γ correction value, color superposition correction value, registration timing value, and values in image forming unit such as voltage set value, paper feed timing set value, and image formation timing set value)

These pieces of information are classified into individual categories and stored as log data. The data saved in a database connected to the station server is analyzed either automatically (e.g., by using an IT tool recently put into practical use) or manually.

(11) Contents of Data Analysis

For example, by calculating the total number of copies, the number of color copies, and the number of black-and-white copies printed since the last maintenance, the contents of maintenance to be performed next are deduced. On the basis of this result, a person in charge of maintenance sets the next maintenance visit date, checks the stock of necessary maintenance parts, and, if the stock is insufficient, orders maintenance parts.

It is also possible to set the date of the next maintenance visit from the preparations for maintenance parts, and inform the user by mail or FAX transmission.

This makes user-oriented maintenance service possible and can thereby improve the customer's satisfaction.

(12) Process of Changing Set Value Information

If the state of the user's image forming apparatus is bad, code data is externally sent to the user by any of electronic mail, facsimile, and mail of a printed-out sheet. In accordance with an attached explanation/request document addressed to the user, the user sets the sent image data on a scanner, reads change information by the scanner, and inputs the information to the image forming apparatus. Data written at the beginning of the input coded data triggers a set value writing sequence previously input to the image forming apparatus, thereby automatically starting a set value writing process. This sequence is substantially analogous to that described in item (3) above and shown in FIG. 6.

In this sequence, copy and set value writing processes and the like are displayed by, e.g., code numbers or icons in a selection menu on the control panel. When the user selects a set value writing process, the set value is rewritten by a value indicated by the supplied code information.

The above embodiments are merely examples. Therefore, these embodiments do not restrict the present invention and can be variously modified where necessary. For instance, operation log information, error information, apparatus status information, and the like are described as examples of information of the image forming apparatus. However, any information useful to improve the maintenance service can be applied to the present invention and sent to the service provider.

What is claimed is:

1. An image forming apparatus for printing out data on the basis of given information, comprising:

a memory for storing information for use in the maintenance of said image forming apparatus;

a capacity determination unit for, when a use capacity of said memory has reached a predetermined value, notifying said memory of information representing that the use capacity has reached the predetermined value and instructing said memory to output the stored information;

a compressing unit for compressing the output information from said memory and outputting as coded information; and a CPU for checking whether said apparatus is connected to a LAN and determining that the coded information is to be output to the LAN if said apparatus is connected to the LAN, for checking whether said apparatus is connected to a telephone line if said apparatus is not connected to the LAN and determining that the coded information is to be output to the telephone line if said apparatus is connected to the telephone line, and for determining that the coded information is to be printed out if said apparatus is not connected to the LAN or to the telephone line.

2. An apparatus according to claim 1, wherein said compressing unit converts the output information from said memory into coded information containing a character and number or bar code type digital information, and outputs the converted information.

3. An apparatus according to claim 2, wherein the coded information containing a character and number is expressed by a base-10+n (n is an integer of not less than 1) number.

4. A communication system for the maintenance of an image forming apparatus, which comprises said image forming apparatus having a printing unit for printing out data on the basis of given information, and a service provider's apparatus for receiving information for use in maintenance of said image forming apparatus, wherein said image forming apparatus comprises:

a memory for storing information for use in the maintenance of said image forming apparatus;

a capacity determination unit for, when a use capacity of said memory has reached a predetermined value, notifying said memory of information representing that the use capacity has reached the predetermined value and instructing said memory to output the stored information;

a compressing unit for compressing the output information from said memory and outputting as coded information; and a CPU for checking whether said apparatus is connected to a LAN and determining that the coded information is to be output to the LAN if said apparatus is connected to the LAN, for checking whether said apparatus is connected to a telephone line if said apparatus is not connected to the LAN and determining that the coded information is to be output to the telephone line if said apparatus is connected to the telephone line, and for determining that the coded information is to be printed out if said apparatus is not connected to the LAN or to the telephone line, and said service provider's apparatus comprises information storage means for sequentially receiving and storing the coded information.

5. A system according to claim 4, wherein said compressing unit converts the output information from said memory into coded information containing a character and number or bar code type digital information, and outputs the converted information.

6. A system according to claim 5, wherein the coded information containing a character and number is expressed by a base-10+n (n is an integer of not less than 1) number.

7. A system according to claim 6, wherein said printing unit of said image forming apparatus prints the coded information output from said compressing unit, and outputs the printed-out sheet, and said service provider's apparatus further comprises:

converting means for reading the image information printed on the printed-out sheet, converting the read image into coded information containing a character and number or bar code type digital information, and outputting the converted information;

an expanding unit for expanding the compressed character information or the compressed bar code type digital information; and a display unit for displaying the expanded information on a screen or printing out the expanded information.

8. A system according to claim 6, wherein said image forming apparatus further comprises a first facsimile unit connected to a communication line to transmit the coded information to said communication line, and said service provider's apparatus further comprises:

a second facsimile unit connected to said communication line to receive and output the coded information transmitted from said first facsimile unit;

an expanding unit for expanding and outputting the compressed information output from said second facsimile unit; and a display unit for displaying the expanded information on a screen or printing out the expanded information.

9. A system according to claim 6, wherein said image forming apparatus further comprises a first server connected to a communication line to transmit the coded information to said communication line, and said service provider's apparatus further comprises:

a second server connected to said communication line to receive and output the coded information transmitted from said first server;

an expanding unit for expanding and outputting the compressed information output from said second server; and a display unit for displaying the expanded information on a screen or printing out the expanded information.

10. A system according to claim 6, wherein said printing unit of said image forming apparatus prints the coded information and outputs a first printed-out sheet, said image forming apparatus further comprises:

converting means for reading and converting information on a second printed-out sheet into first character information; and a setting change unit for changing a set value of said image forming apparatus on the basis of the converted first character information, and said service provider's apparatus further comprises:

converting means for reading and converting image information printed on the first printed-out sheet into compressed second information, and outputting the compressed second information;

an expanding unit for expanding the compressed second information;

a display unit for displaying the expanded second information on a screen or printing out the expanded second information; and a printing unit for outputting the second printed-out sheet containing information which designates a change of a set value of said image forming apparatus.

11. A system according to claim 6, wherein said image forming apparatus further comprises:

a first facsimile unit connected to a communication line to transmit the coded first information to said communication line and receive second information transmitted from said communication line; and a setting change unit for changing a set value of said image forming apparatus on the basis of the received second information, and said service provider's apparatus further comprises:

a second facsimile unit connected to said communication line to receive and output the coded first information transmitted from said first facsimile unit, and transmit the second information designating a change of a set value of said image forming apparatus;

an expanding unit for expanding and outputting the coded compressed first information output from said second facsimile unit; and a display unit for displaying the expanded first information on a screen or printing out the expanded first information.

12. A system according to claim 6, wherein
said image forming apparatus further comprises:
a first server connected to a communication line to transmit the coded first information to said communication line, and receive the second information transmitted from said communication line; and
a setting change unit for changing a set value of said image forming apparatus on the basis of the received second information, and
said service provider's apparatus further comprises:
a second server connected to said communication line to receive and output the coded first information transmitted from said first server, and transmit the second information designating a change of a set value of said image forming apparatus;
an expanding unit for expanding and outputting the coded compressed first information output from said second server; and
a display unit for displaying the expanded character information on a screen or printing out the expanded character information.

13. A maintenance service method of an image forming apparatus which prints out data on the basis of given information, comprising the steps of:
storing information for use in maintenance of said image forming apparatus into a memory;
causing said memory to output the stored information when a use capacity of said memory has reached a predetermined value;
compressing the output information from said memory and outputting the compressed information as coded information; and
checking whether said apparatus is connected to a LAN and determining that the coded information is to be output to the LAN if said apparatus is connected to the LAN, for checking whether said apparatus is connected to a telephone line if said apparatus is not connected to the LAN and determining that the coded information is to be output to the telephone line if said apparatus is connected to the telephone line, and for determining that the coded information is to be printed out if said apparatus is not connected to the LAN or to the telephone line.

14. A method according to claim 13, wherein the step of compressing the image comprises converting the output information from said memory into coded information containing a character and number or bar code type digital information.

15. A method according to claim 14, wherein the step of compressing the information and outputting as coded information comprises using a base-10+n (n is an integer of not less than 1) number.

16. A method by which a service provider provides a maintenance service to a user's image forming apparatus having a printing unit for printing out data on the basis of given information, comprising the steps of:
storing information for use in maintenance of said image forming apparatus into a memory;
causing said memory to output the stored information when the use capacity of said memory has reached a predetermined value;
compressing the output information from said memory and outputting the compressed information as coded information, and
checking whether said apparatus is connected to a LAN and determining that the coded information is to be output to the LAN if said apparatus is connected to the LAN, for checking whether said apparatus is connected to a telephone line if said apparatus is not connected to the LAN and determining that the coded information is to be output to the telephone line if said apparatus is connected to the telephone line, and for determining that the coded information is to be printed out if said apparatus is not connected to the LAN or to the telephone line,
on the user side; and
sequentially storing the coded information,
on the service provider side.

17. A method according to claim 16, further comprising the steps of:
printing the compressed coded information as image information by using said printing unit; and
reading the image information printed on the printed-out sheet, converting the read information into compressed character information or compressed bar code type digital information, and outputting the converted information,
on the user side; and
expanding the compressed character information or the compressed bar code type digital information; and
displaying the expanded information on a screen or printing out the expanded information,
on the service provider side.

18. A method according to claim 16, further comprising the steps of:
transmitting the coded information to a communication line by using a first facsimile unit, which is connected to said communication line, of said image forming apparatus,
on the user side; and
receiving the coded information transmitted from said first facsimile unit by using a second facsimile unit connected to said communication line;
expanding the compressed information received by said second facsimile unit; and
displaying the expanded information on a screen or printing out the expanded information,
on the service provider side.

19. A method according to claim 16, further comprising the steps of:
transmitting the coded information to a communication line by using a first server connected to said communication line,
on the user side; and
receiving the coded information transmitted from said first server by using a second server connected to said communication line;
expanding the compressed information received by said second server; and
displaying the expanded information on a screen or printing out the expanded information,
on the service provider side.

20. A method according to claim 16, further comprising the steps of:
printing the coded information and outputting a first printed-out sheet by using said printing unit;

reading and converting information on the first printed-out sheet into first information, and outputting the first information; and changing a set value of said image forming apparatus on the basis of the first information, on the user side; and reading image information printed on the first printed-out sheet and converting the image information into compressed second information;

expanding the compressed second information;

displaying the expanded second information on a screen or printing out the expanded second information; and outputting a second printed-out sheet containing information which designates a change of a set value of said image forming apparatus, on the service provider side.

21. A method according to claim 16, further comprising the steps of:

transmitting the coded first information to a communication line, and receiving second information transmitted from said communication line, by using a first facsimile unit connected to said communication line; and changing a set value of said image forming apparatus on the basis of the received second information, on the user side; and receiving the coded first information transmitted from said first facsimile unit, and transmitting the second information which designates a change of a set value of said image forming apparatus, by using a second facsimile unit connected to said communication line;

expanding the coded compressed first information received by said second facsimile unit; and displaying the expanded first information on a screen or printing out the expanded first information, on the service provider side.

22. A system according to claim 16, further comprising the steps of:

transmitting the coded first information to a communication line, and receiving second information transmitted from said communication line, by using a first server connected to said communication line; and changing a set value of said image forming apparatus on the basis of the received second information, on the user side; and receiving the coded first information transmitted from said first server, and transmitting the second information which designates a change of a set value of said image forming apparatus, by using a second server connected to said communication line;

expanding the coded compressed first information received by said second server; and displaying the expanded first information on a screen or printing out the expanded first information, on the service provider side.

* * * * *